US006996089B1

(12) United States Patent
Ruf et al.

(10) Patent No.: US 6,996,089 B1
(45) Date of Patent: Feb. 7, 2006

(54) METHOD OF TRANSMITTING DIGITALLY CODED TRAFFIC INFORMATION AND RADIO RECEIVER FOR SAME

(75) Inventors: Michael Ruf, Hildesheim (DE); Ulrich Kersken, Diekholzen (DE); Claus Dorenbeck, Himmelpforten (DE); Heinrich Schmidt, Diekholzen (DE); Karin Hempel, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/501,639

(22) Filed: Feb. 11, 2000

(30) Foreign Application Priority Data

Feb. 11, 1999 (DE) ............................... 199 05 893

(51) Int. Cl.
*H04J 3/24* (2006.01)

(52) U.S. Cl. ................... 370/349; 370/395.1; 701/117; 701/208; 340/995.13

(58) Field of Classification Search ........ 370/328–661; 701/211, 117, 208, 209; 340/989, 995, 539.1, 340/539.13, 7.48, 988, 995.13
See application file for complete search history.

(56) References Cited

U.S. PATENT DOCUMENTS 5,355,526 A * 10/1994 Berninger ................ 455/161.2
5,493,709 A * 2/1996 Duckeck et al. ......... 455/185.1
5,655,561 A * 8/1997 Wendel et al. ................ 137/79
5,903,216 A * 5/1999 Sutsos et al. ............... 340/542
5,933,094 A * 8/1999 Goss et al. ................. 340/905
5,987,382 A * 11/1999 Weishaupt et al. .......... 701/211
5,999,934 A * 12/1999 Cohen et al. ............... 707/100
6,262,976 B1 * 7/2001 McNamara ................. 370/254
6,278,660 B1 * 8/2001 Tognazzini .................. 368/21
6,289,012 B1 * 9/2001 Harrington et al. ......... 370/389
6,434,138 B2 * 8/2002 Kersken et al. ............. 370/349
6,438,561 B1 * 8/2002 Israni et al. ............. 707/104.1

FOREIGN PATENT DOCUMENTS

DE 35 36 820 C2 1/1990

* cited by examiner

*Primary Examiner*—Steven Nguyen
*Assistant Examiner*—Roberta Shand
(74) *Attorney, Agent, or Firm*—Michael J. Striker

(57) ABSTRACT

A method of transmitting digitally coded traffic information is described, in which a digitally coded traffic message including location information is transmitted is standard format, preferably according to the TMC method. When the location information in the traffic message requires change and/or completion, a header is provided in front of the traffic message, which indicates that additional information including changes or additions to the location information in the traffic message follows the traffic message. A receiver for reception and analysis of the digitally coded traffic information is also provided, which analyses the traffic information including the additional information to obtain the changed or completed location information.

4 Claims, 2 Drawing Sheets

METHOD OF TRANSMITTING DIGITALLY CODED TRAFFIC INFORMATION AND RADIO RECEIVER FOR SAME

BACKGROUND OF THE INVENTION

1. Field of the Invention

The present invention relates to a method for transmission of digitally coded traffic information and, more particularly, to a method for transmission of digitally coded traffic information according to a standard format, especially according to the TMC method. It also relates to a radio receiver for the traffic information, especially traffic information produced according to the TMC method.

2. Prior Art

DE 35 36 820 C2 already describes the structure of a receiver, in which the standardized traffic information is received. Vehicle traffic information, including predetermined highway and street numbers and route information, chiefly locations and standard text associated with the locations, can be very rapidly transmitted in a coded manner. The highway numbers, the route information and other place names and associated standard texts are stored in a memory and are communicated to a suitable radio receiver. If a traffic obstacle occurs, that information is transmitted digitally in a brief or compact coded form and then translated into a complete message in the radio receiver. Because of that method a complete vehicle traffic message can be transmitted with comparatively few bytes, so that a large amount of vehicle traffic information may be transmitted in a comparatively short time in a data transmission system with small power consumption.

It is troublesome when highway or street designations or place names and associated information have changed due to construction. Then location data, which are no longer readable in form, such as of signs, are reproduced by the radio receiver equipped with a memory, so that the vehicle operator is irritated.

SUMMARY OF THE INVENTION

It is an object of the present invention to provide an improved method of transmitting digitally coded vehicle traffic information and a receiver for this information.

According to the invention at least one location description is added to the basic standard coded traffic information. Because of that feature it is possible to change place names or to transmit place names associated with the described location, which were not originally stored in the memory of the radio receiver. Digital radio information is increasingly being broadcast and also transmission methods, which can transmit large amounts of data, are increasingly available for that digital radio information. Because of these developments it is also possible to store only the predetermined standard textual information in the vehicle memory and to generally depend on the transmitted digitally coded traffic information for the location or place information, or to completely eliminate the memory from the radio receiver. This increases the flexibility of the digitally transmitted traffic information to a great extent. The header that is received in the radio receiver then also serves not only to communicate digitally coded traffic information, but also digitally coded traffic data, location information and other information.

Thus in the method according to the invention digitally coded traffic information including traffic messages having a standard format, such as those coded according to TMC, are transmitted. According to the method each of the traffic messages includes a leading header and at least one additional information portion following the leading header. Location information in the at least one additional information portion is an essential feature of the invention.

Further improved features are set forth in the appended dependent method claims.

The header is advantageously used to simultaneously encode vehicle traffic information. Because of that feature it is possible to make vehicle traffic information available when certain services are received or fees paid. It is preferable to divide the additional information into classes. Each class has a class indicator and at least one data packet of information. By dividing the information into classes it is not only possible to transmit location information but also additional information in the vehicle traffic information, for example to provide the memory in the radio receiver with new location data, or to transmit textual information in a foreign language regarding location designations so that vehicle operators traveling abroad, or in a foreign country, can receive the information in their native tongue. It is also beneficial to transmit the number of following data packets after the classification designation. Because of that feature of the method it is guaranteed that the radio receiver is in a position to completely receive all the information in one class. It is also beneficial to define each data packet by packet type, which means according to the content of the information and the data. Because of this latter feature of the method it is possible to transmit different types of information in one data packet. It is also advantageous to establish a respective minimum time for handling packets for each information class. As a result, all necessarily required actual information for each classification is guaranteed.

The subject matter of the invention also includes a suitably designed radio receiver for receiving the digitally coded vehicle traffic information produced by the method according to the invention. This radio receiver has a separating device for digital data and speech information and an evaluating circuit for evaluation of digitally transmitted traffic information. With this radio receiver it is possible, on the one hand, to verify the receiver reception and, on the other hand, to determine what information is received in the data packets besides the digitally coded vehicle traffic information. It is also advantageous when the radio receiver has a memory only for standard text information. Because of this latter feature the standard text need not be transmitted in each case.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
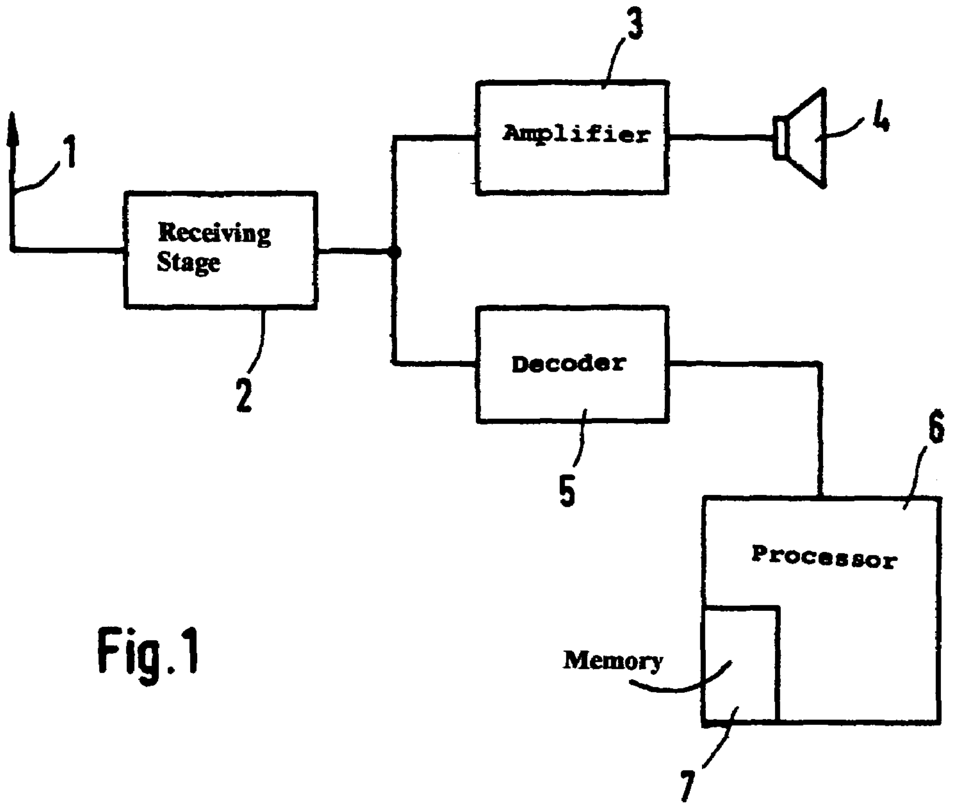
FIG. 1 is a block diagram of a radio receiver according to the invention.

FIG. 1 shows a radio receiver, for example a radio receiver with an antenna 1, in which a receiving stage 2 is connected. The decoded received signal is available at the output of the receiving stage 2. Spoken traffic information as well as spoken words and music are broadcast in known FM radio broadcasts. Digitally coded traffic information is also broadcast by means of a radio data system, RDS. The coding is based on a standard format, which was specially developed for the limited data capacity of RDS. The received information is then separated at the output of the receiving stage 2. The spoken words are input into an amplifier stage 3 and made audible to a listener by means of a loud speaker 4. The digitally transmitted data are input to a decoder 5, at whose output a serial signal with so-called TMC data is available. This serial signal is then further processed in the microprocessor 6 and an acoustic or optical signal containing the information in the serial signal is produced for the driver of the vehicle.

In the current transmissions of traffic information on a standardized basis lists and tables must be carried along into the end device for decoding the received message, as is described in the above-mentioned patent, because of the reduced transmission bandwidths, the channel properties and other performance parameters, for example, the speech independence. TMC messages currently operate not only to inform the driver, but also to provide dynamic navigation, which means consideration of the current traffic situation during computation of the travel route in the navigation system. The current travel situation was transmitted by TMC, so that, for example, the navigation system provides suggestions, such as how to avoid a traffic jam.

The problem with TMC lies in the lists and tables input into the end device, in which especially the location code table is designated, which has the list of locations for the relevant street network for the vehicle traffic. An events list is also transmitted, in which the possible events are set forth, for example the length of the traffic blockages and the reason, why a traffic jam arises. The set up of the location code table is a problem because of the required memory space. Furthermore not all traffic announcements can be coded, especially when the location code table is no longer current because of blockage of streets or addition of new streets. The events list allows only the use of pre-defined events. New events cannot be transmitted by TMC in its known form. On the other hand, TMC itself has an increasing popularity since a greater information content can be provided by the current standard format with very little information.

TMC no longer only finds application to an increasing extent in FM radio broadcasting, but is similarly used in connection with GSM radio telephone transmissions, which make use of the TMC position with short transmission times. Also in the newer modern radio transmission system, such as digital audio broadcasting (DAB) TMC is used as the language of choice. However the new transmission methods, because of developing technology, are in a position to considerably increase the data rates than is the case with RDS-TMC.

Figure 2:
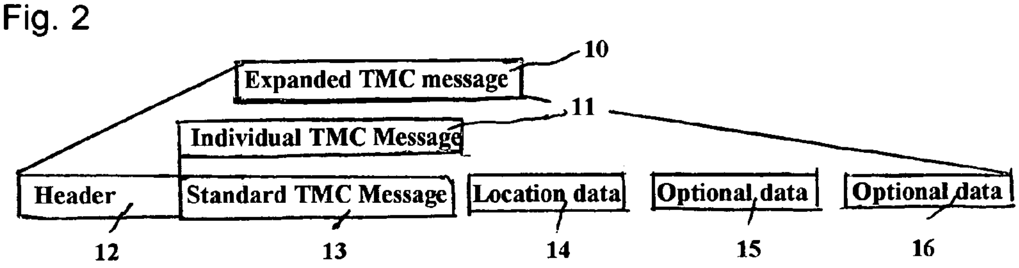
FIG. 2 is a diagram of one embodiment of a data word according to the invention.

Essentially however a separation of speech information and TMC information must occur in all radio reception systems after reception and demodulation of the information, which must be processed in a suitable way in a processor. In FIG. 2 now a process for transmission of digitally coded traffic information is shown, which is backwards compatible with the known TMC method, which means that it offers additional information possibilities using the known TMC method. A standard broadcast TMC message 13 is augmented or expanded. The augmented or expanded standard TMC message 10 includes a header 12 and the individual TMC message 11. The message 11 itself comprises a standard TMC message 13 as well as added information packets 14, 15 and 16. If a header 12 is placed in front of the TMC message, at least one additional information portion 14 must be present. This additional information portion 14 must always be location information. The additional information portion 15 and 16 and further additional information are optional and are for transmission of different types of data.

The header 12 is necessary in order to be able to detect that expanded or augmented TMC information follows it. The header 12 can contain information regarding how many additional information portions 14, 15, 16 follow the basic TMC message and serve to perform an encoding of the TMC message as needed. The presence of encoding must be signaled and simultaneously the type of coating must be specified. Thus a coding indicator must be processed in the header. Thus it is possible to encode the TMC data differently and to transmit different TMC information according to the service, for example by GSM or DAB. For example, it is thus possible to associate a first coding method with one service provider A and another coding method with a second service provider B. Thus it is possible to transmit different traffic information by means of GSM, either by the short message channel or by common GSM signal according to the service provider. The header is thus in a position to distinguish still other characteristics, such as the encoding and the notice of how much additional information is to be expected, as well as the expanded TMC message.

While the structure of the TMC message 13 is standard, so that it is not described in detail here, the additional information can be structured differently. It is important that at least one additional information portion 14 contains a location description, since an expanded or augmented TMC message would otherwise make no sense.

Figure 3:
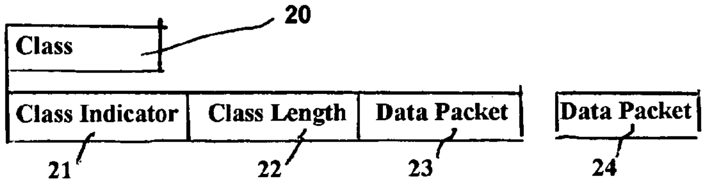
FIG. 3 is a diagram of a class according to the invention.
Figure 4:
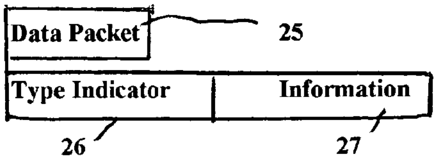
FIG. 4 is a diagram showing the structure of a data packet.

An additional information portion is illustrated in detail in FIG. 3. The additional information, which can have different content, is divided into so-called classes 20. Each class 20 thus includes a class indicator 21, a class length 22, which states the number of following additional information packets, and the following additional information packets 23 and 24. It is important here that certain classes with certain class indicators have a minimum number of required packets, so that optimum evaluation of the TMC data is possible. However also an arbitrary number of additional optional packets may be added. The definition of the class 20 is usually also useable for the TMC message 13 itself. The code for the TMC message itself is then used as the class indicator at position 21, while the class length designates the number of the TMC messages. Respective TMC groups follow as data packets 23 and 24. One TMC message to be transmitted is thus in one data packet, while several TMC messages are in respective data packets. The standard traffic message includes traffic information not only from one group but also from up to five groups. In this case as many as five data packets 23, 24 must be employed for the traffic message. The structure of a data packet is illustrated in FIG. 4, in which the data packet is indicated as data packet 25, and comprises a type indicator 26 and the following data 27. The type indicator 26 indicates whether or not the following data belongs to a previous data packet, or whether the data 27 are automatically interpretable in themselves. Now several traffic messages are transmitted together in a TMC message by means of the TMC message component 13 based on the structure of the classes.

As already mentioned one of the additional information portions 14 must contain a class for location descriptions.

Information about the coded location statements in the TMC message is located here. Dependent on the type of situation described in the TMC message one or more different data packets are necessary for this type of location description. The different combinations of number, type and following sequence for the data packets leads to a plurality of different classes. These different classes include required information. The required information includes location information, for example, data packets for street names, for names or abbreviations of streets, their numbers, coordinates, audio building blocks and the like. It is thus possible to add information that is continually kept up to date with TMC data transmitted in coded form. For the receiver this provides the advantage that the above-mentioned memory must be present in a GSM hand radio unit, since the data for coding the TMC packet are transmitted with the location information included in the classes. Because of this feature display of the information on a display device is possible. If audio information is also transmitted, speech reproduction is also possible. If coordinates are also added, these coordinates are immediately transferred to the navigation unit for use, so that a new route calculation can be simplified. Now application-specific data can be included in additional classes, for example additional information for special navigation system suggestions regarding noteworthy or especially dangerous situations, such as steep slopes, smooth ice or curves.

The microprocessor 6 shown in FIG. 1 also contains a memory 7, in which normal events are stored in a special embodiment of the invention. Since the standard events change more frequently than location data, a mixed operation can occur according to the invention, in which a part of the required TMC information, especially the events, such as "3 km traffic jam" and the like, is stored in a memory of the radio receiver, while other information entities, or their changes more likely, are transmitted. However this is not required. Understandably it is also possible to provide no memory at all and to transmit the events as additional information, or to previously store a complete list of location codes and events and only to transmit that data as expanded informational topics, which are not contained in the location code list.

Different data packet types, which can be transmitted in one class of additional information, are for example tabulated in the following Table I.

TABLE I

DATA PACKET TYPES TRANSMITTED IN ONE CLASS OF ADDITIONAL INFORMATION

| TYPE NUMBER | PACKET TYPE | TYPE LENGTH | DESCRIPTION |
|---|---|---|---|
| 0 | Number | 5 byte | TMC group |
| 1 | Number | 8 byte | Location: ECC + CC + LocDB# + Location code (by ALERT C) |
| 2 | Number | 1 byte | Street class (Primary, secondary, etc., coded as 1, 2, etc.) |
| 3 | Street Information | n byte | Street type (e.g Ave, St, etc.) |
| 4 | Street Information | n byte | Street number (e.g. 4, 1204, etc.) |
| 5 | Text | n byte | Street suffix (e.g. n, old, etc.) |
| 6 | Name | n byte | Street name (e.g Kölner Ring) |
| 7 | Name | n byte | 1. segment name |
| 8 | Name | n byte | 2. segment name |
| 9 | Text | n byte | Location type (according to ENV12313-3, e.g. A1.0.P1.13, etc.) |
| 10 | Text | n byte | Location type - indicator (e.g. exit road) |

TABLE I-continued

DATA PACKET TYPES TRANSMITTED IN ONE CLASS OF ADDITIONAL INFORMATION

| TYPE NUMBER | PACKET TYPE | TYPE LENGTH | DESCRIPTION |
|---|---|---|---|
| 11 | Name | n byte | Location name (e.g. Hildesheim-Drispenstedt) |
| 12 | Number | n byte | Exit number (e.g. 17b) |
| 13 | Text | n byte | Region designation (e.g. Governmental district) |
| 14 | Name | n byte | Region name (e.g. Hannover) |
| 15 | Number | n byte | By-pass road number |
| 16 | Text | n byte | By-pass road suffix |
| 17 | Coordinates | 18 byte | Point coordinates (WGS84) |
| 18 | Coordinates | 36 byte | Coordinates-pair (WGS84) |
| 19 | Number | 8 byte | Cross-reference in other Location codes |
| 20 | Street Indicator | n byte | European Street Number (e.g. 4 for the E4) |
| 21 | Audio | n byte | Audio data |
| 22 | Number | 1 byte | Version number (location of the Data bank) |
| 23 | Text | n byte | Free text |
| 24 | | n byte | Destination location list (for keeping the lists in the end device up-to-date) |

TABLE II

DIFFERENT CLASS STRUCTURES

| Number | REQUIRED PACKETS | OPTIONAL PACKETS | DESCRIPTION |
|---|---|---|---|
| 1 | 1, 9, 10, 17 | 12, 13 | Regional Announcement |
| 2 | 1, 2, 4, 7, 8, 17 | 3, 5, 6, 12, 13, 14, 19 | Street or segment Announcement |
| 3 | 1, 2, 4, 9, 10, 13, 16 | 3, 5, 6, 7, 8, 12, 18, 19 | Location inside of city or town |
| 4 | 1, 2, 4, 7, 8, 9, 10, 11, 16 | 3, 5, 6, 12, 13, 14, 15, 18 | Location outside of city or town |
| 5 | 1, 2, 4, 9, 10, 13, 16 | 3, 5, 6, 12, 18, 19 | Two locations in A city |
| . . . | | | |
| . . . | | | |
| . . . | | | |
| 9 | 2, 4, 7, 8, 1, 9, 10, 11, 16, 1, 9, 10, 11, 16 | 3, 5, 6, 12, 14, 15, 18, 19 | 2 locations, both outside a city |
| . . . | | | |
| 17 | 245 | — | Location list update |
| . . . | | | |

Here in Table II class 1 is described with certain packet type numbers according to table I and also two optional packets can be transmitted, but of course they are not required. This is also similar for the remaining classes.

In the following paragraphs, the manner of coding of an expanded TMC message is described as an example of the method according to the invention. The following message is a typical traffic radio message for trouble on an autobahn. "A4 Olpe heading to Köln, between Bergisch-Gladbach, Moitzfeld and Bergisch-Gladbach, Bensber, 2 km stacked up traffic".

If this traffic message is coded according to standard hexadecimal, the following representation results: 08 086E 2B74. This was the information, which was transmitted as a traffic announcement, as TMC message 13 in a data packet 23. It is best to use class 9 according to Table II as the class for the location information because of the situation described in the traffic message. This has the structure or format as shown in the following Table III.

TABLE III

EXEMPLARY INFORMATION PORTION CLASS

| Class d. Location Information | Required Packets (packet types) | Optional Packets (packet types) | |
|---|---|---|---|
| 9 | 2, 4, 7, 8, 1, 9, 10, 11, 16, 1, 9, 10, 11, 16 | 3, 5, 6, 12, 14, 15, 18, 19 | 2 locations, both outside a city |

List of required data packets:
Element 2: Street class: 1
Element 4: Street number: 4
Element 7: Olpe
Element 8: Köln
1. Element 1: ECC=EO, CC=D, LocDB#=1;Location code=2B74h
1. Element 9: P1.3
1. Element 10: Bergisch-Gladbach Moitzfeld
1.Element 11: 20
1. Element 16: 007642312,051238721
2. Element 1: ECC=EO, CC=D, LocDB#=1;Location code=2B73h
2. Element 9: P1.3
2. Element 10: Bergisch-Gladbach Bensberg
2.Element 11: 19
2. Element 16: 007542342,051029628
List of Optional Data Packets:
Element 14: 50 (Since the U50 leads from Moitzfeld to Bensber)
Element 19: 40 (Since the A4 is part of the E40).

Because of the information now present it is not only possible to transfer the required information to the navigation device, but also to retrieve the above-mentioned traffic message. Without the use of the method according to the invention some additional information must be stored in the radio receiver.

Location data for the start of a traffic jam, the end of the traffic jam, intervening aid points or actual time lost can be transmitted as additional information in the further fields 15 and 16, which result because of the traffic density on the streets. Furthermore the event classes are transmittable as additional information or similar description. It is then possible to sort the traffic messages according to different criteria with the aid of the event classes.

The disclosure in German Patent Application 199 05 893.8 of Feb. 11, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of transmitting digitally coded traffic information and radio receiver for same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A method of transmitting digitally coded traffic information to drivers of vehicles traveling on a network of streets and highways, said traffic information including, if necessary, additional location information regarding changes in and additions to highway and street designations and place names, said method comprising the steps of:

a) coding a traffic message in a standard format for transmission to at least one vehicle traveling on said network of streets and highways;

b) when said additional location information regarding said changes in and said additions to said highway and street designations and said place names is not originally present in a memory associated with a receiver of said traffic message, providing a leading header (12) in front of said traffic message encoded in said standard format and at least one additional information portion (14, 15, 16) following said traffic message encoded in said standard format, said at least one additional information portion including said additional location information due to said changes and said additions to said highway and street designations and said place names, and wherein said leading header indicates that said at least one additional information portion follows said traffic message encoded in said standard format and said header includes coding information regarding coding of said at least one additional information portion;

c) transmitting said traffic message encoded in said standard format together with said leading header (12) and said at least one additional information portion (14, 15, 16) to said at least one vehicle;

d) providing said at least one vehicle with said receiver and with means for decoding said traffic message encoded in said standard format and said at least one additional information portion, said means for decoding including a location code table for correlating the highway and the street designations and the place names with location codes in said traffic message, said location code table being stored in said memory associated with said receiver; and e) decoding said traffic message encoded in said standard format and transmitted to said at least one vehicle with the help of said location code table; and f) decoding said at least one additional information portion (14, 15, 16) with the help of said coding information in said header.

2. The method as defined in claim 1, wherein said transmitting of said traffic message encoded in said standard format with said leading header (12) and said at least one additional information portion to said at least one vehicle takes place by broadcasting with a radio data system and said standard format is a format suitable for radio broadcasting.

3. The method as defined in claim 2, wherein said receiver and said means for decoding said traffic message encoded in said standard format and said at least one additional information portion comprise a receiving stage (2) and a decoder (5) connected with a processor (6) and said memory (7) for storing said location code table.

4. The method as defined in claim 1 or 3, wherein said traffic message encoded in said standard format is coded according to a TMC method.

* * * * *